(12) United States Patent
Fly et al.

(10) Patent No.: US 6,663,994 B1
(45) Date of Patent: Dec. 16, 2003

(54) FUEL CELL WITH CONVOLUTED MEA

(75) Inventors: Gerald W. Fly, Geneseo, NY (US);
Brian K. Brady, North Chili, NY (US)

(73) Assignee: General Motors Corporation, Detroit, MI (US)

(*) Notice: Subject to any disclaimer, the term of this patent is extended or adjusted under 35 U.S.C. 154(b) by 186 days.

(21) Appl. No.: 09/694,386

(22) Filed: Oct. 23, 2000

(51) Int. Cl.[7] ............................ H01M 8/02; H01M 8/10
(52) U.S. Cl. ............................ 429/30; 429/33; 429/34
(58) Field of Search .......................... 429/30, 31, 32, 429/33, 40

(56) References Cited

U.S. PATENT DOCUMENTS

| | | | |
|---|---|---|---|
| 4,125,676 A | * 11/1978 | Maricle et al. | 429/38 |
| 4,567,086 A | 1/1986 | Fukuda et al. | |
| 4,826,741 A | * 5/1989 | Aldhart et al. | 429/19 |
| 5,272,017 A | 12/1993 | Swathirajan et al. | |
| 5,316,871 A | 5/1994 | Swathirajan et al. | |
| 5,441,822 A | 8/1995 | Yamashita et al. | |
| 5,508,128 A | 4/1996 | Akagi | |
| 5,618,392 A | * 4/1997 | Furuya | 204/242 |
| 5,620,807 A | 4/1997 | Mussell et al. | |
| 5,635,069 A | * 6/1997 | Boss et al. | 40/491 |
| 5,658,681 A | 8/1997 | Sato et al. | |
| 5,707,755 A | 1/1998 | Grot | |
| 5,776,624 A | 7/1998 | Neutzler | |
| 6,017,650 A | 1/2000 | Ramunni et al. | |
| 6,024,848 A | 2/2000 | Dufner et al. | |
| 6,037,073 A | 3/2000 | Besmann et al. | |
| 6,054,228 A | * 4/2000 | Cisar et al. | 429/18 |
| 6,083,638 A | 7/2000 | Taniguchi et al. | |
| 6,146,780 A | * 11/2000 | Cisar et al. | 429/34 |
| 6,232,010 B1 | 5/2001 | Cisar et al. | |
| 6,379,833 B1 | 4/2002 | Hill et al. | |
| 2002/0012825 A1 | * 1/2002 | Sasahara et al. | 429/30 |

FOREIGN PATENT DOCUMENTS

| | | | | |
|---|---|---|---|---|
| DE | 197 09 571 C1 | 3/1997 | | H01M/4/86 |
| DE | 197 09 571 | 6/1998 | | |
| GB | 2339063 A | * 1/2000 | | |
| GB | 2 339 067 | 1/2000 | | |
| JP | 409245820 | 9/1997 | | |
| JP | 2002-151107 | 5/2002 | | |
| WO | WO 99/57781 | 4/1999 | | H01M/8/24 |
| WO | WO 00/02267 | 7/1999 | | |
| WO | WO 00/02268 | 7/1999 | | |
| WO | WO 00/02269 | 7/1999 | | |
| WO | WO 00/02270 | 7/1999 | | |
| WO | WO 00/02272 | 7/1999 | | |
| WO | WO 00/02273 | 7/1999 | | |
| WO | WO 00/02275 | 7/1999 | | |
| WO | WO 00/02276 | 7/1999 | | |
| WO | WO 02/05373 A1 | 1/2002 | | |

OTHER PUBLICATIONS

International Search Report dated Nov. 29, 2002, Int'l App. No. PCT/US02/05766.

* cited by examiner

*Primary Examiner*—Patrick Ryan
*Assistant Examiner*—Gregg Cantelmo
(74) *Attorney, Agent, or Firm*—Karl F. Barr, Jr.; Cary W. Brooks; Linda M. Deschere

(57) ABSTRACT

A proton exchange membrane fuel cell including a membrane electrode assembly comprising a proton transmissive membrane, a catalytic anode layer on one face of the membrane, and a catalytic cathode layer on the other face of the membrane. The fuel cell further includes a gas distribution layer on each of the cathode and anode layers defining a gas flow field extending over each of the catalytic layers. The membrane electrode assembly has a convoluted configuration whereby to increase the ratio of membrane area to planar fuel cell area and thereby increase the electrical output of the fuel cell for a given planar area size fuel cell. The convoluted configuration of the membrane electrode assembly also facilitates the division of the gas distribution layers into separate parallel channels thereby allowing the use of an inexpensive foam material for the gas distribution layers irrespective of the inherent variations in porosity of foam materials.

20 Claims, 8 Drawing Sheets

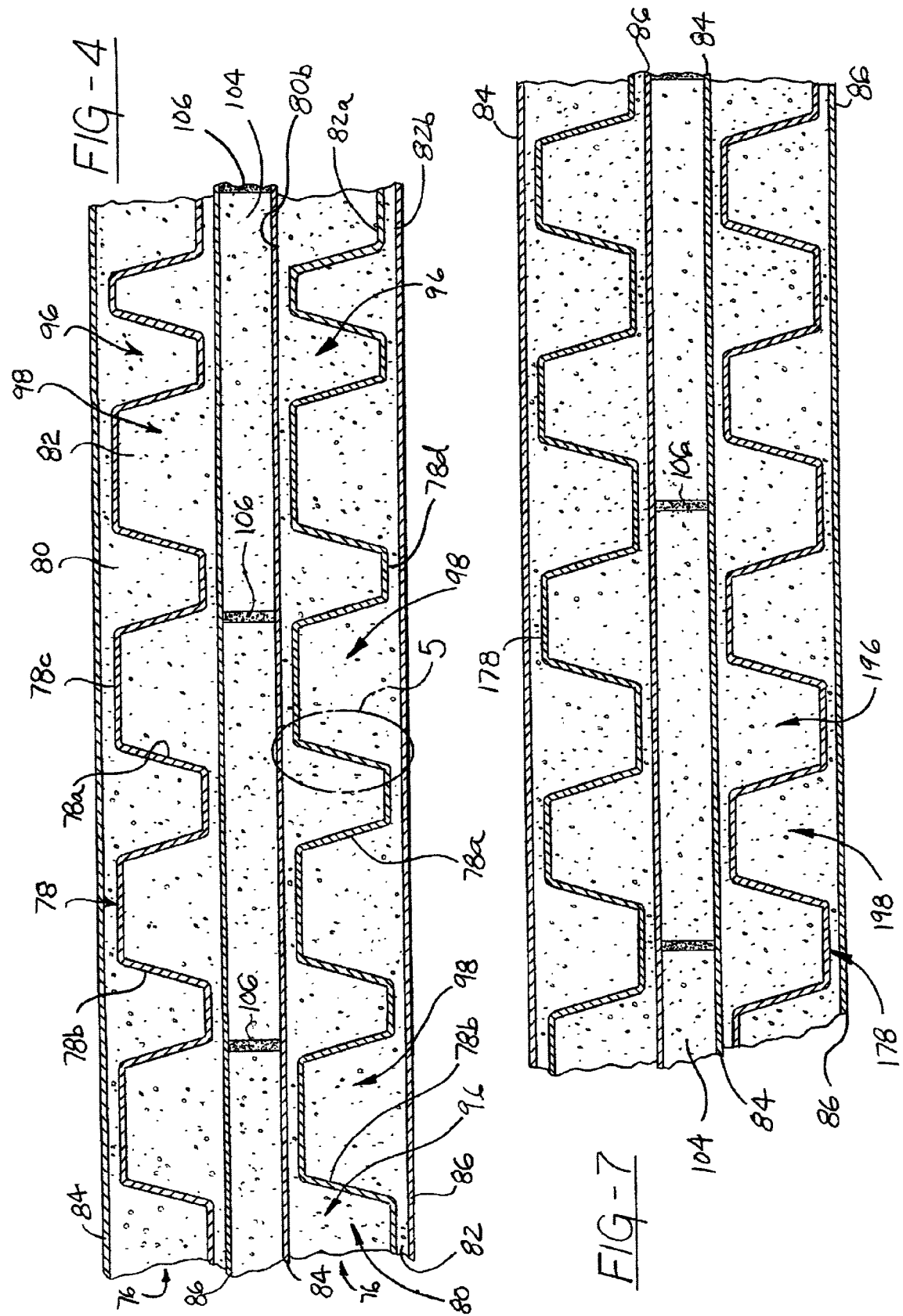

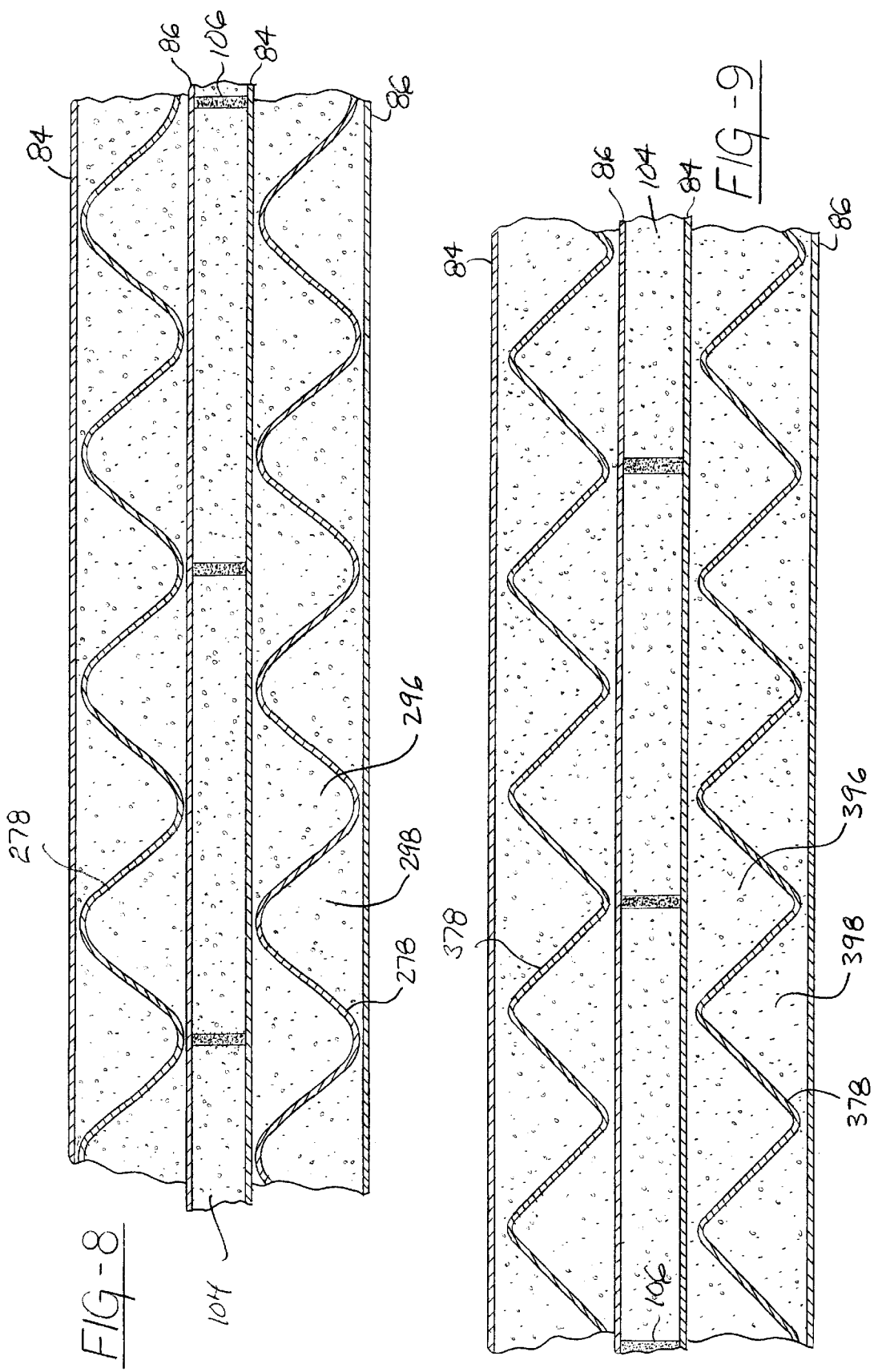

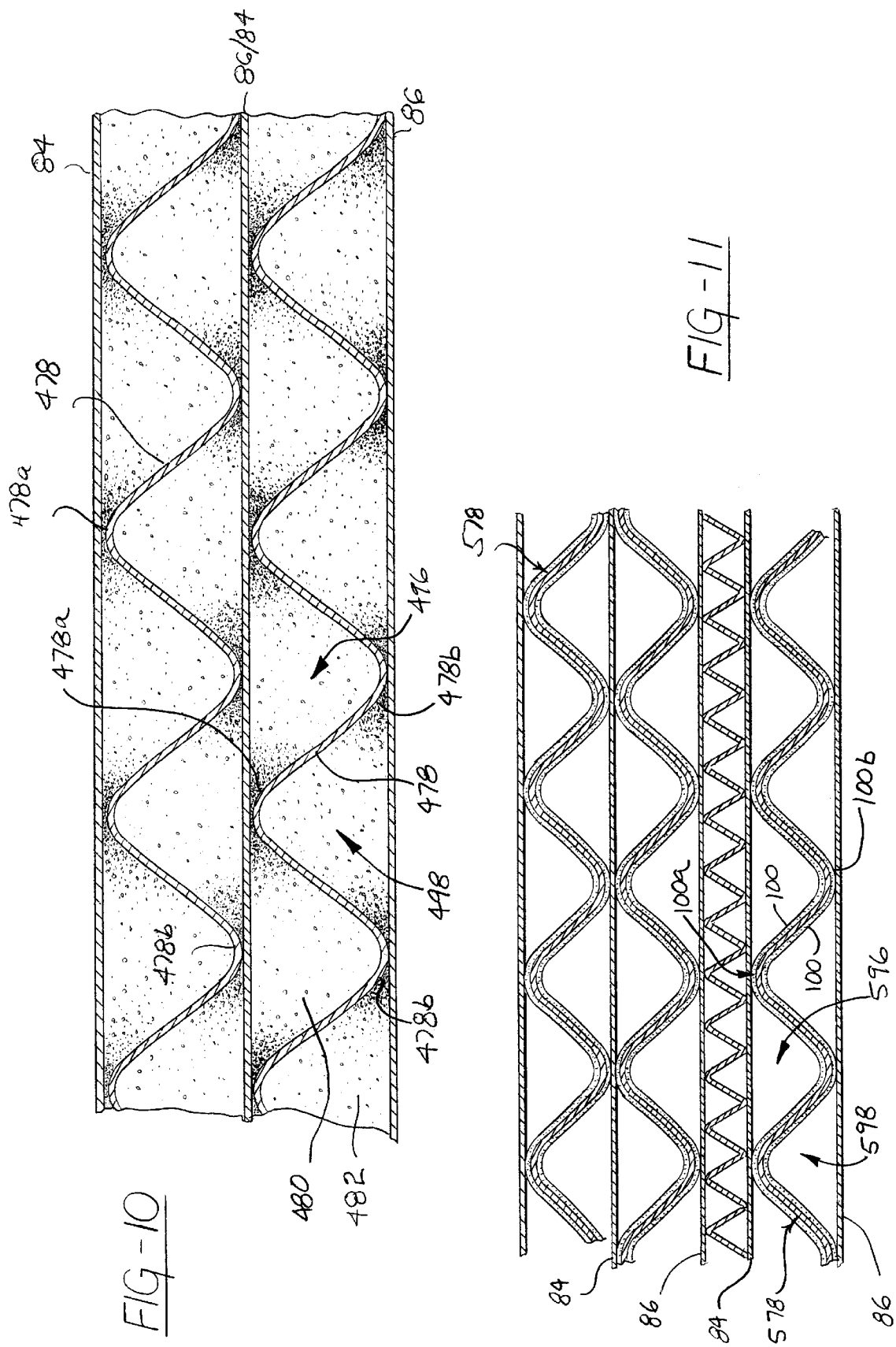

FUEL CELL WITH CONVOLUTED MEA

FIELD OF THE INVENTION

This invention relates to a fuel cell system and more particularly to a system having a plurality of cells which consume an $H_2$-rich gas to produce power.

BACKGROUND OF THE INVENTION

Fuel cells have been used as a power source in many applications. For example, fuel cells have been proposed for use in electrical vehicular power plants to replace internal combustion engines. In proton exchange membrane (PEM) type fuel cells, hydrogen is supplied to the anode of the fuel cell and oxygen is supplied as the oxidant to the cathode. PEM fuel cells include a membrane electrode assembly (MEA) comprising a thin, proton transmissive, non-electrically conductive solid polymer electrolyte membrane having the anode catalyst on one of its faces and the cathode catalyst on the opposite face. The MEA is sandwiched between a pair of electrically conductive elements which (1) serve as current collectors for the anode and cathode, and (2) contain appropriate channels and/or openings therein for distributing the fuel cell's gaseous reactants over the surfaces of the respective anode and cathode catalysts. The term fuel cell is typically used to refer to either a single cell or a plurality of cells (stack) depending on the context. A plurality of individual cells are commonly bundled together to form a fuel cell stack and are commonly arranged in series. Each cell within the stack comprises the membrane electrode assembly (MEA) described earlier, and each such MEA provides its increment of voltage. A group of adjacent cells within the stack is referred to as a cluster. Typical arrangements of multiple cells in a stack are described in U.S. Pat. No. 5,763,113, assigned to General Motors Corporation.

In PEM fuel cells, hydrogen ($H_2$) is the anode reactant (i.e., fuel) and oxygen is the cathode reactant (i.e., oxidant). The oxygen can be either a pure form ($O_2$), or air (a mixture of $O_2$ and $N_2$). The solid polymer electrolytes are typically made from ion exchange resins such as perfluoronated sulfonic acid. The anode/cathode typically comprises finely divided catalytic particles, which are often supported on carbon particles, and mixed with a proton conductive resin. The catalytic particles are typically costly precious metal particles. These membrane electrode assemblies are relatively expensive to manufacture and require certain conditions, including proper water management and humidification, and control of catalyst fouling constituents such as carbon monoxide (CO), for effective operation.

For vehicular applications, it is desirable to use a liquid fuel such as an alcohol (e.g., methanol or ethanol), or hydrocarbons (e.g., gasoline) as the source of hydrogen for the fuel cell. Such liquid fuels for the vehicle are easy to store onboard and there is a nationwide infrastructure for supplying liquid fuels. However, such fuels must be dissociated to release the hydrogen content thereof for fueling the fuel cell. The dissociation reaction is accomplished within a chemical fuel processor or reformer. The fuel processor contains one or more reactors wherein the fuel reacts with steam and sometimes air, to yield a reformate gas comprising primarily hydrogen and carbon dioxide. For example, in the steam methanol reformation process, methanol and water (as steam) are ideally reacted to generate hydrogen and carbon dioxide. In reality, carbon monoxide and water are also produced. In a gasoline reformation process, steam, air and gasoline are reacted in a fuel processor which contains two sections. One is primarily a partial oxidation reactor (POX) and the other is primarily a steam reformer (SR). The fuel processor produces hydrogen, carbon dioxide, carbon monoxide and water. Downstream reactors may include a water/gas shift (WGS) and preferential oxidizer (PROX) reactors. In the PROX, carbon dioxide ($CO_2$) is produced from carbon monoxide (CO) using oxygen from air as an oxidant. Here, control of air feed is important to selectively oxidize CO to $CO_2$.

Fuel cell systems which process a hydrocarbon fuel to produce a hydrogen-rich reformate for consumption by PEM fuel cells are known and are described in U.S. Pat. Nos. 6,232,005, 6,077,620, and 6,238,815, issued respectively May 15, 2001, Jun. 20, 2000, and May 29, 2001, assigned to General Motors Corporation, assignee of the present invention; and in International Application Publication Number WO 98/08771, published Mar. 5, 1998. A typical PEM fuel cell and its membrane electrode assembly (MEA) are described in U.S. Pat. Nos. 5,272,017 and 5,316,871, issued respectively Dec. 21, 1993 and May 31, 1994, assigned to General Motors Corporation, and incorporated herein by reference in their entirety.

The electrically conductive elements sandwiching the MEAs may contain an array of grooves in the faces thereof for distributing the fuel cell's gaseous reactants (i.e., hydrogen and oxygen in the form of air) over the surfaces of the respective cathode and anode. In the fuel cell stack, a plurality of cells are stacked together in electrical series while being separated one from the next by a gas impermeable, electrically conductive bipolar plate. Heretofore, the bipolar plate has served several functions including (1) as an electrically conductive gas separator element between two adjacent cells; (2) to distribute reactant gases across substantially the entire surface of the membrane; (3) to conduct electrical current between the anode of one cell and the cathode of the next adjacent cell in the stack; (4) to keep the reactant gases separated in order to prevent auto ignition; (5) to provide a support for the proton exchange membrane; and (6) in most cases to provide internal cooling passages therein defined by internal heat exchange faces and through which a coolant flows to remove heat from the stack. The bipolar plate also accommodates the gas pressure loads as well as the compression loads on the plates. For example, the plate includes a plurality of channels on one side and a plurality of channels on the other side with the channels on an individual side being separated by lands. The arrangement of the lands and the channels on both sides has to be such that the bipolar plate can withstand the compression loads so that the lands and the channels are arranged so that they do not collapse or warp the bipolar plate. The bipolar plate includes channels to deliver the hydrogen and oxygen to a proton exchange membrane assembly overlying the bipolar plates. A piece of graphite paper is placed over the serpentine channels to prevent the membrane from collapsing down into the channel and blocking the flow of gas and to provide an electrical conduction path to the bipolar plate from the area of the membrane which overlays the channel.

The bipolar plates may be made from metal but the plates can also be manufactured from other materials. For example, bipolar plates are often fabricated from graphite which is lightweight (compared to traditional metal plates), corrosion resistant and electrically conductive in the PEM fuel cell environment. However, graphite is quite brittle which makes it difficult to handle mechanically and has a relatively low electrical and thermal conductivity compared to metals.

Finally, graphite is quite porous making it virtually impossible to make very thin gas impervious plates which is desired for low weight, low volume, low internal resistant fuel cell stacks.

Neutzler, U.S. Pat. No. 5,776,624, discloses a metal bipolar plate and PEM assembly of this channel type. These prior art bipolar plates and PEM assemblies are heavy, bulky, difficult to produce and assemble, and costly to manufacture.

By contrast, efficient operation of a fuel cell system depends on the ability of the fuel cell to generate a significant amount of electrical energy for a given size, weight, and cost of the fuel cell. Maximizing the electrical energy output of the fuel cell for a given size, weight, and cost is especially important in motor vehicle applications where size, weight, and cost of all vehicular components are especially critical to the efficient manufacture and operation of the vehicle. Therefore it is desirable, especially for motor vehicle applications, to provide a fuel cell construction which will generate an increased amount of electrical energy for a given size, weight, and cost of the fuel cell.

SUMMARY OF THE INVENTION

The invention relates to a proton exchange membrane fuel cell including a membrane electrode assembly (MEA) comprising a proton transmissive membrane, a catalytic anode layer on one face of the membrane, and a catalytic cathode layer on the other face of the membrane, and an electrically conductive distribution layer on each of the cathode and anode layers defining a gas flow field extending over each of the catalytic layers.

According to the invention, the MEA has a convoluted configuration. This arrangement has the affect of increasing the ratio of membrane area to effective planar area of the fuel cell whereby to increase the electrical output of the fuel cell for a given effective planar fuel cell area.

According to a further feature of the invention, each gas distribution layer defines a convoluted surface juxtaposed to the respective catalytic layer. This arrangement maximizes the contact interface between the MEA and the gas distribution layers whereby to further increase the electrical output of the cell per unit of planar area.

According to a further feature of the invention, the surface of each gas distribution layer opposite the convoluted surface is generally planar. This arrangement facilitates the stacking of individual cells to form a fuel cell stack.

According to a further feature of the invention, each gas distribution layer is formed of a conductive porous media. This arrangement facilitates the delivery of the respective gases to the respective catalytic layers.

According to a further feature of the invention, the porous media comprises a foam media. This arrangement allows the use of readily available, relatively inexpensive foam material to provide the porous media. In the disclosed embodiment of the invention, the foam media comprises either a conductive graphite foam media or a conductive metallic foam media.

According to a further feature of the invention, the MEA and the gas distribution layers form a sandwich construction having first and second opposite edges; and each gas distribution layer is divided by the convolutions of the MEA into a plurality of generally parallel segments each extending from the first edge to the second of the sandwich construction whereby to define a plurality of generally parallel porous reactant paths extending across each catalytic layer.

With this arrangement the gases are confined by the parallel paths for movement in the respective paths so that little or no cross migration occurs between the parallel paths whereby to ensure an essentially uniform distribution of gas across the surface of the respective underlying catalytic layer irrespective of unavoidable and significant variations in the porosity of the foam material of the porous media, whereby to maximize the generation of electrical energy occurring by virtue of the interaction between the gases and the catalytic layers.

According to a further feature of the invention, the fuel cell further includes upper and lower generally planar gas separators defining a space therebetween and the MEA and the gas distribution layers are positioned in the space with the peaks of the MEA positioned proximate the upper gas separator and the valleys of the MEA positioned proximate the lower gas separator. This arrangement accentuates the separation of the porous reactant paths extending across each catalytic layer.

According to a further feature of the invention, each gas distribution layer has an overall convoluted configuration corresponding to the convoluted configuration of the MEA and is positioned in meshing fashion against a respective catalytic layer. This arrangement provides an unobstructed gas flow area across the fuel cell which in turn allows a reduction in the overall size of the fuel cell while remaining within accepted pressure drop specifications.

According to a further feature of the invention, the fuel cell further includes a conductive lower generally planar gas separator and a conductive upper generally planar gas separator positioned above the lower gas separator and defining a space therebetween, and the MEA is positioned in the space with successive peaks on one of the gas distribution layers in electrical contact with successive points on the upper gas separator and successive valleys of the other gas distribution layer in electrical contact with successive points on the lower gas separator. This arrangement provides the required electrical conductivity through the fuel cell while maintaining unobstructed flow of gases across the catalytic layers with consequent reduction in the overall size of the fuel cell.

According to a further feature of the invention, the convolutions of the MEA are uneven such that one of the upper and lower channels are larger than the other of the upper and lower channels. This arrangement facilitates the delivery of disparate quantities of the respective gases to the respective catalytic layers. In the disclosed embodiment of the invention, alternate convolutions are relatively wide, whereby to define the larger channels, and the remaining convolutions are relatively narrow, whereby to define the smaller channels.

BRIEF DESCRIPTION OF THE DRAWINGS

The various features, advantages and other uses of the present invention will become more apparent by referring to the following description and drawings in which:

FIG. 4 is a cross-sectional view taken on line 4—4 of FIG. 3;

FIGS. 7–11 are cross-sectional views of alternate forms of fuel cells according to the invention.

DETAILED DESCRIPTION OF THE PREFERRED EMBODIMENTS

Figure 1:
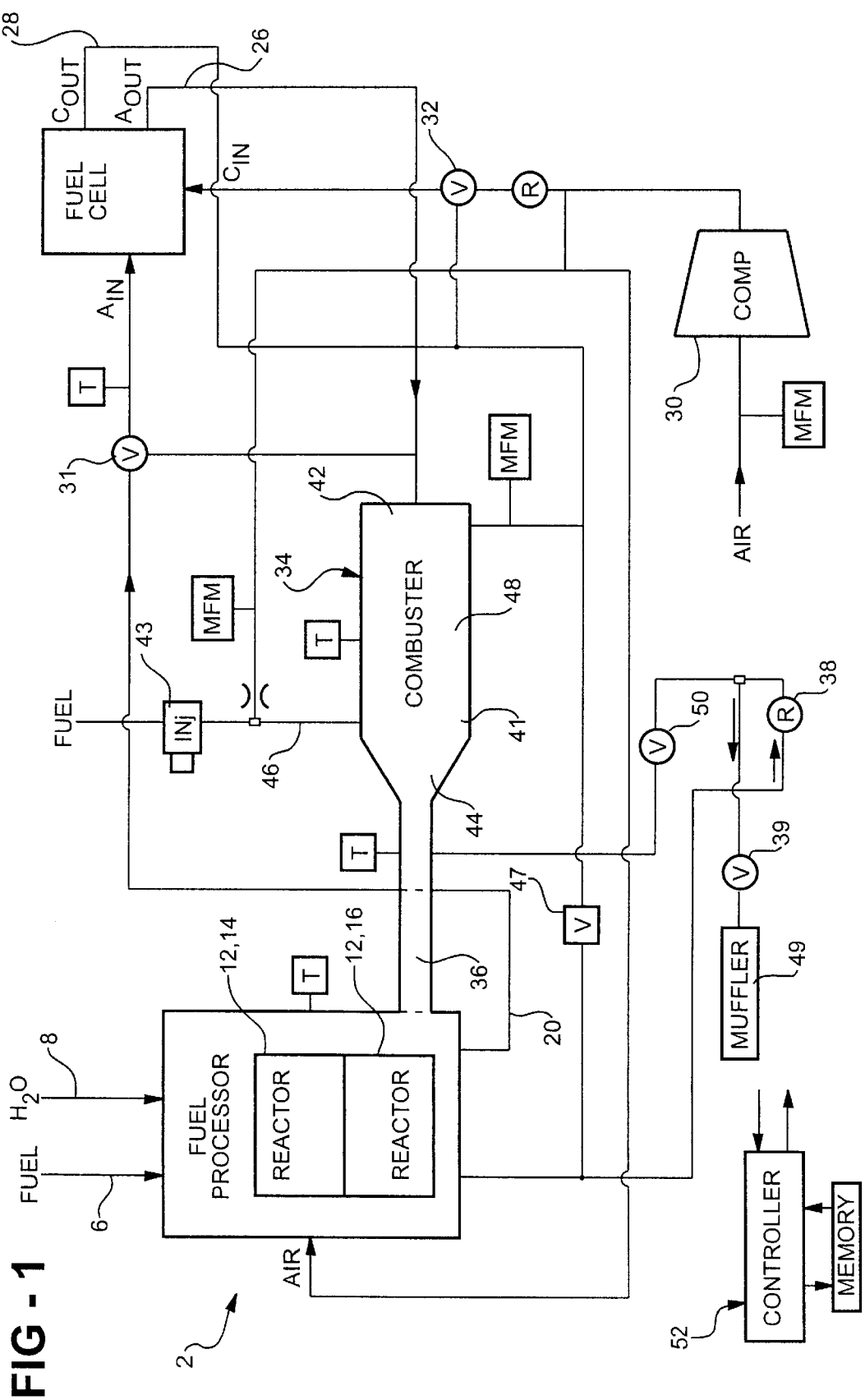
FIG. 1 is a schematic view of a fuel cell system incorporating a fuel cell stack according to the invention.

The invention may be further understood with reference to the fuel cell system shown in FIG. 1 by example only. Therefore, before further describing the invention, it is useful to understand the system within which the improved fuel cell of the invention operates.

FIG. 1 illustrates an example of a fuel cell system. The system may be used in a vehicle (not shown) as an energy source for vehicle propulsion. In the system, a hydrocarbon is processed in a fuel processor, for example, by reformation and preferential oxidation processes, to produce a reformate gas which has a relatively high hydrogen content on a volume or molar basis. Therefore, reference is made to hydrogen-rich or relatively high hydrogen content.

The invention is hereafter described in the context of a fuel cell fueled by $H_2$-rich reformate regardless of the method by which such reformate is made. It is to be understood that the principles embodied herein are applicable to fuel cells fueled by $H_2$ obtained from any source, including reformable hydrocarbon and hydrogen-containing fuels such as methanol, ethanol, gasoline, alkene, or other aliphatic or aromatic hydrocarbons, or from $H_2$ stored on board.

As shown in FIG. 1, a fuel cell apparatus includes a fuel processor 2 for catalytically reacting a reformable hydrocarbon fuel stream 6, and water in the form of steam from a water stream 8. In some fuel processors, air is also used in a combination preferential oxidation/steam reforming reaction. In this case, fuel processor 2 also receives an air stream 9. The fuel processor contains one or more reactors 12 wherein the reformable hydrocarbon fuel in stream 6 undergoes dissociation in the presence of water/steam 8 and sometimes air (in stream 9) to produce the hydrogen-rich reformate. Further, each reactor 12 may comprise one or more reactor beds. Reactor 12 may have one or more sections or beds, and a variety of designs are known and usable. Therefore, the selection and arrangement of reactors 12 may vary; and exemplary fuel reformation reactor(s) 14 and downstream reactor(s) 16 are described immediately below.

By way of example, in an exemplary steam/methanol reformation process, methanol and water (as steam) are ideally reacted in a reactor 14 to generate hydrogen and carbon dioxide as described earlier in the background. In reality, carbon monoxide and water are also produced. By way of further example, in an exemplary gasoline reformation process, steam, air and gasoline are reacted in a fuel processor which comprises a reactor 14 which has two sections. One section of the reactor 14 is primarily a partial oxidation reactor (POX) and the other section of the reactor is primarily a steam reformer (SR). As in the case of methanol reformation, gasoline reformation produces the desired hydrogen but, in addition, produces carbon dioxide, water and carbon monoxide. Therefore, after each type of reformation, it is desirable to reduce the carbon monoxide content of the product stream.

Accordingly, the fuel processor typically also includes one or more downstream reactors 16, such as water/gas shift (WGS) and preferential oxidizer (PROX) reactors which are used to produce carbon dioxide from carbon monoxide, as described earlier in the background. Preferably, the initial reformate output gas stream which comprises hydrogen, carbon dioxide, carbon monoxide and water is further treated in a preferential oxidation (PROX) reactor 16 to reduce the CO-levels therein to acceptable levels, for example, below 20 ppm. Then, during running mode, the $H_2$ rich reformate 20 is fed through valve 31 into the anode chamber of a fuel cell stack 22. At the same time, oxygen (e.g., air) from an oxidant stream 24 is fed into the cathode chamber of the fuel cell stack 22. The hydrogen from the reformate stream 20 and the oxygen from the oxidant stream 24 react in the fuel cell stack 22 to produce electricity.

Exhaust or effluent 26 from the anode side of the fuel cell stack 22 contains some unreacted hydrogen. The exhaust or effluent 28 from the cathode side of the fuel cell stack 22 contains some unreacted oxygen. Air for the oxidant stream 24 is provided by an air supply, preferably compressor 30. Air from the air supply (compressor 30) is directed to the fuel cell stack 22 by a valve 32 under normal operating conditions. During start-up, however, the valve 32 is actuated to provide air directly to the input of a combustor 34. The air is used in combustor 34 to react with a fuel supplied through line 46. The heat of combustion is used to heat various parts of the fuel processor 2.

It should be noted that some of the reactions which occur in fuel processor 2 are endothermic and so require heat; other reactions are exothermic and require removal of heat. Typically, the PROX reactor 16 requires removal of heat. One or more of the reformation reactions in reactor 14 are typically endothermic and require heat be added. This is typically accomplished by preheating reactants, fuel 6, steam 8, and air 9 and/or by heating selected reactors.

Heat from the combustor 34 heats selected reactors and reactor beds in the fuel processor 2 during start-up. The combustor 34 achieves heating of the selected reactors and beds in the fuel processor, as necessary, by indirect heat transfer thereto. Typically, such indirectly heated reactors comprise a reaction chamber with an inlet and an outlet. Within the reaction chamber, the beds are in the form of carrier member substrates each having a first surface carrying catalytically active material for accomplishing the desired chemical reactions. A second surface opposite the first surface is for heat transfer from hot gases to the carrier member substrates. In addition, the combustor 34 is usable to preheat the fuel 6, water 8 and air 9 being supplied as reactants to the fuel processor 2.

It should be noted that the air 9 supplied to the fuel processor 2 may be used in one or more of the reactors 12. If reactor 14 is a gasoline reformation reactor, then air from line 9 is supplied to reactor 14. The PROX reactor 16 also utilizes air to oxidize CO to $CO_2$ and also receives air from air supply source (compressor 30) via line 9.

The combustor 34 defines a chamber 41 with an inlet end 42, an exhaust end 44 and a catalyst section 48 between the ends. Hydrocarbon fuel is injected into the combustor. The hydrocarbon fuel, if in liquid form, is preferably vaporized either before being injected into the combustor or in a section of the combustor to disperse the fuel for combustion. Vaporization may be done by an electric heater. Once the system is operating and the combustor has heated up, vaporization may occur by heat exchange using heat from the combustor exhaust to vaporize incoming fuel. Preferably, a fuel metering device 43 is provided to control the rate at which hydrocarbon fuel is provided to the combustor.

The hydrocarbon fuel 46 and the anode effluent 26 are reacted in the catalyst section 48 of the combustor 34, which section is between the inlet and exhaust ends 42 and 44, respectively, of the combustor 34. Oxygen is provided to the combustor 34 either from the air supply (i.e., compressor 30) via valve 32 or from a second air flow stream, such as a cathode effluent stream 28, depending on system operating conditions. A valve 50 permits release of the combustor exhaust 36 to atmosphere when it is not needed to heat reactors in the fuel processor 2.

As can be seen, the hydrocarbon fuel stream 46 supplements the anode effluent 26 as fuel for the combustor 34, as may be needed, to meet the transient and steady state needs of the fuel cell apparatus. In some situations, exhaust gas passes through a regulator 38, a shutoff valve 39 and a muffler 49 before being released to the atmosphere. In FIG. 1, the symbols are as follows: V is valve, MFM is mass flow meter, T is temperature monitor, R is regulator, C is cathode side, A is anode side of fuel cell, INJ is injector, and COMP is compressor.

The amount of heat demanded by the selected reactors within the fuel processor 2, which is to be supplied by the combustor 34, is dependent upon the amount of fuel and water input and ultimately the desired reaction temperature in the fuel processor 2. As stated earlier, sometimes air is also used in the fuel processor reactor and must also be considered along with the fuel and water input. To supply the heat demand of the fuel processor 2, the combustor 34 utilizes all anode exhaust or effluent and potentially some hydrocarbon fuel. Enthalpy equations are used to determine the amount of cathode exhaust air to be supplied to the combustor 34 to meet the desired temperature requirements of the combustor 34 and the combustor 34 ultimately satisfies the heat demanded by the fuel processor 2. The oxygen or air provided to the combustor 34 includes one or both of cathode effluent exhaust 28, which is typically a percentage of the total oxygen supplied to the cathode of the fuel cell stack 22, and a compressor output air stream depending on whether the apparatus is operating in a start-up mode wherein the compressor air stream is exclusively employed, or in a run mode using the cathode effluent 28 and/or compressor air. In the run mode, any total air, oxygen or diluent demand required by the combustor 34, which is not met by the cathode effluent 28, is supplied by the compressor 30 in an amount to satisfy the temperature and heat demanded by the combustor 34 and the fuel processor 2, respectively. The air control is implemented via an air dilution valve 47 which preferably is a stepper motor driven valve having a variable orifice to control the amount of bleed-off of cathode exhaust 28 supplied to the combustor 34.

In this exemplary representation of a fuel cell apparatus, operation is as follows. At the beginning of operations when the fuel cell apparatus is cold and starting up: (1) the compressor 30 is driven by an electric motor energized from an external source (e.g., a battery) to provide the necessary system air; (2) air is introduced into the combustor 34; hydrocarbon fuel 46 (e.g., MeOH or gasoline) is injected into the combustor 34; (3) the air and fuel react in the combustor 34, where substantially complete combustion of the fuel is effected; and (4) the hot exhaust gases exiting the combustor 34 are conveyed to the selected reactors 12 associated with the fuel processor 2.

Once the reactors in the fuel processor 2 have attained adequate temperature, the reformation process begins and the process includes the following: (1) valve 32 is activated to direct air to the cathode side of the fuel cell stack 22; (2) fuel and water are fed to the fuel processor 2 to commence the reformation reaction; (3) reformate exiting the fuel processor 2 is fed to the anode side of the fuel cell stack 22; (4) anode effluent 26 from the fuel cell stack 22 is directed into the combustor 34; (5) cathode effluent 28 from the fuel cell stack 22 is directed into the combustor 34; (6) the fuel, air, cathode effluent 28 and anode effluent 26 are burned in the combustor 34. In a preferred sequence, step (2) is implemented first along with the supplying of air directly to the combustor. Then, when the hydrogen-rich stream has an adequately low CO level, steps (1) and (3) are implemented, followed by steps (4), (5) and (6).

Under certain conditions, the combustor 34 could operate solely on the anode and cathode effluents, without the need for additional hydrocarbon fuel 46. Under such conditions, fuel injection to the combustor 34 is discontinued. Under other conditions, e.g., increasing power demands, supplemental fuel 46 is provided to supplement the Aout (26) to the combustor 34. It can be seen that the combustor 34 receives multiple fuels, such as a hydrocarbon fuel as well as anode effluent 26 from the anode of the fuel cell stack 22. Oxygen depleted exhaust air 28 from the cathode of the fuel cell stack 22 and air from the compressor 30 are also supplied to the combustor 34.

According to the present fuel cell system example, a controller 52 shown in FIG. 1 controls various aspects of the operation of the system shown in FIG. 1. The controller 52 may comprise any suitable microprocessor, microcontroller, personal computer, etc., which has central processing unit capable of executing a control program and data stored in a memory. The controller 52 may be a dedicated controller specific to any of the components in FIG. 1, or implemented in software stored in the main vehicle electronic control module. Further, although software based control programs are usable for controlling system components in various modes of operation as described above, it will also be understood that the control can also be implemented in part or whole by dedicated electronic circuitry.

Figure 2:
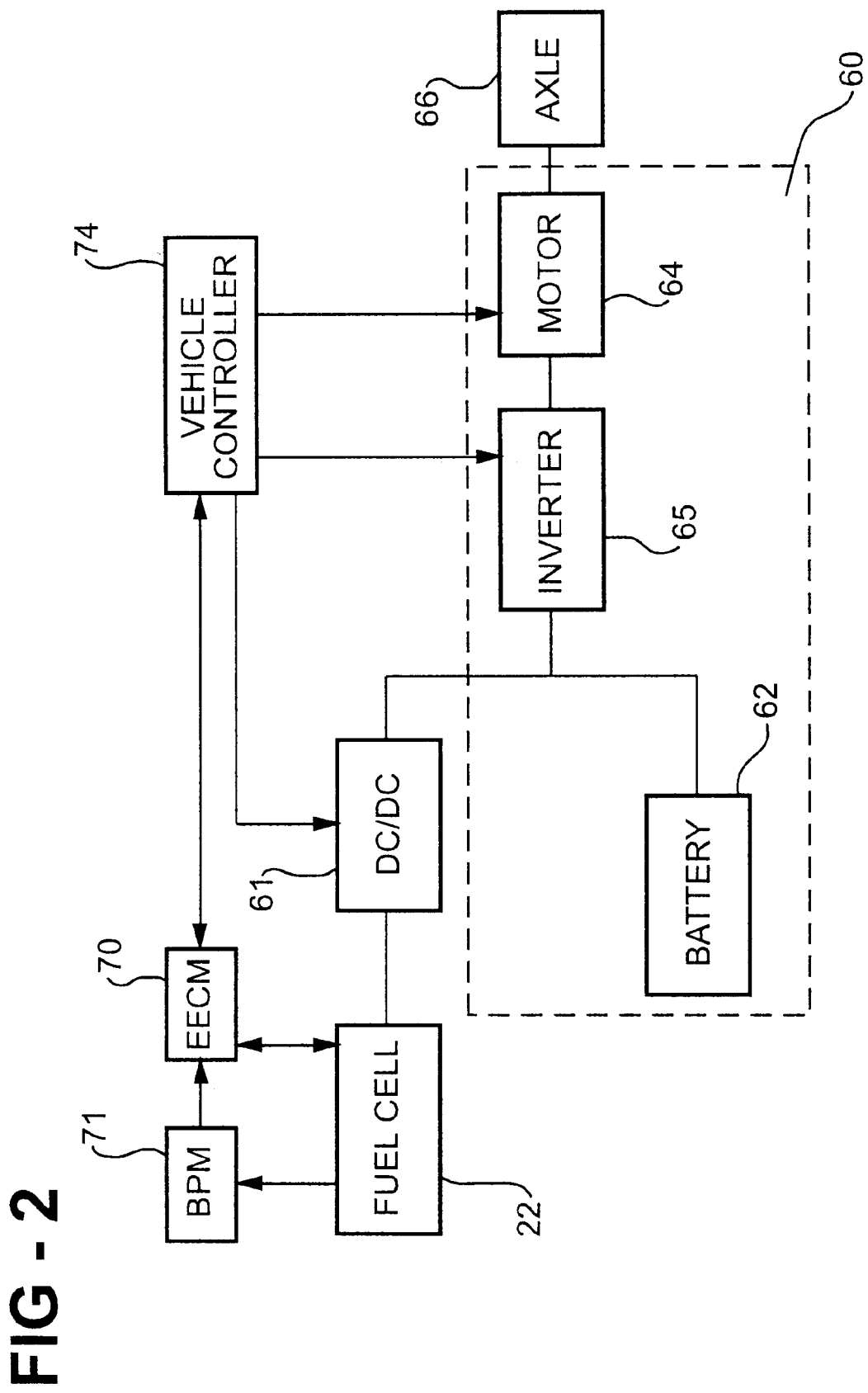
FIG. 2 is a schematic view of the fuel cell stack shown in FIG. 1 connected in a pictorial representation of a motor vehicle application.

In a preferred embodiment, the fuel cell system comprises the fuel cell stack 22 as part of a vehicle propulsion system 60 (see FIG. 2). Here, a portion of the system 60, comprises a battery 62, an electric motor 64, and associated drive electronics including inverter 65 constructed and arranged to accept electric energy from a DC/DC converter 61 associated with the fuel cell system, and particularly fuel cell stack 22, and to convert it to mechanical energy produced by motor 64. The battery 62 is constructed and arranged to accept and store electrical energy supplied by fuel cell stack 22 and to accept and store electrical energy supplied by motor 64 during regenerative braking, and to provide electric energy to motor 64. The motor 64 is coupled to driving axle 66 to rotate wheels of a vehicle (not shown). An electrochemical engine control module (EECM) 70 and a battery pack module (BPM) 71 monitor various operating parameters, including, but not limited to, the voltage and current of the stack. For example, this is done by the battery pack module (BPM) 71, or by the BPM 71 and the EECM 70 together, to send an output signal (message) to the vehicle controller 74 based on conditions monitored by the BPM 71. The vehicle controller 74 controls the electric motor 64, the drive electronics including inverter 65, the DC/DC converter 61, and requests a power level from the EECM 70.

Figure 3:
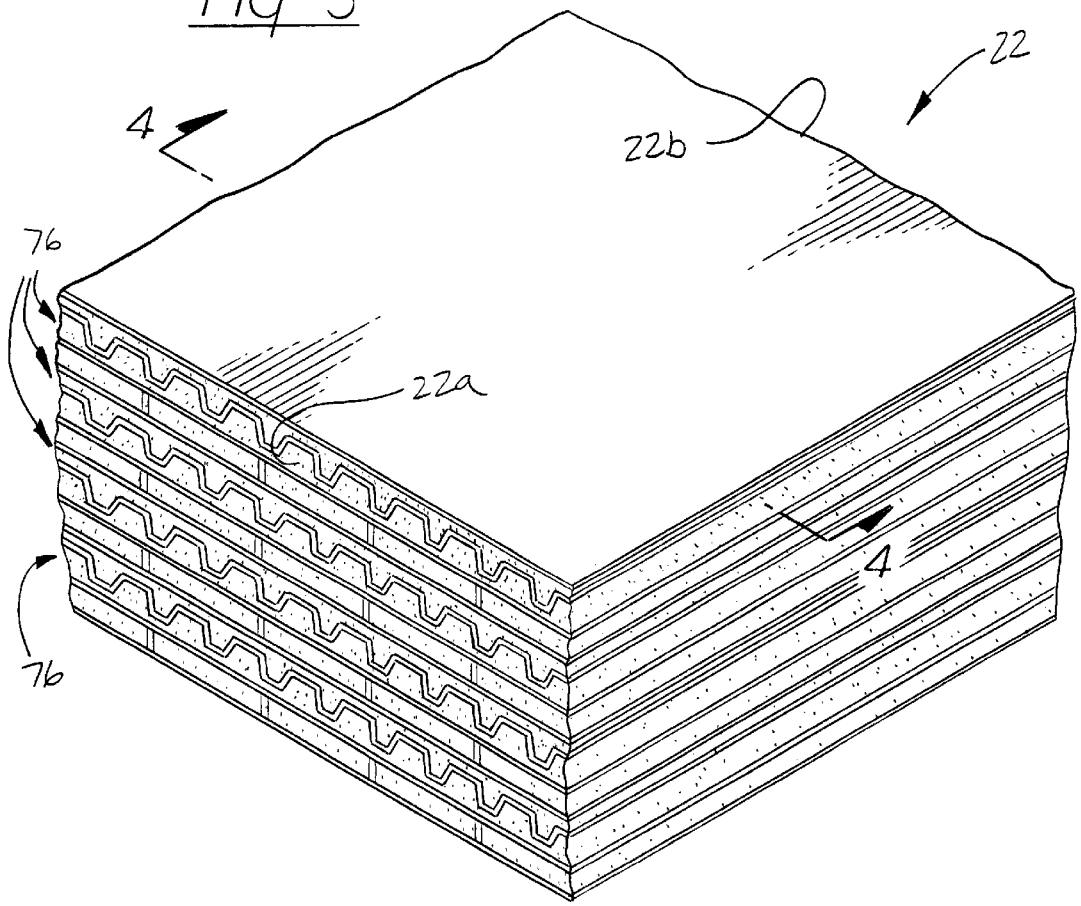
FIG. 3 is a perspective view of a fuel cell stack according to the invention.

The present invention concerns fuel cell stack 22 and particularly the construction of the fuel cell stack whereby the fuel cell stack may be made lighter, smaller, and less expensively without a sacrifice in performance or conversely may provide a larger electrical output for a given fuel cell size. The invention fuel cell stack is seen schematically and perspectively in FIG. 3. Broadly considered, reformate 20 and air 24 are delivered to the fuel cell stack in the manner previously described and oxygen depleted air 28 and hydrogen effluent 26 are exhausted from the stack.

In overview, the stack includes a plurality of fuel cell 76 arranged in a stacked configuration. It will be understood that the fuel cell stack further includes a suitable manifold structure (not shown) for delivering the reformate 20 and the oxidant stream 24 to the individual cells and for exhausting depleted air 28 and hydrogen affluent 26 from the cells. A manifold of the general type suitable for use with fuel cell stack 22 is shown, for example, in co-pending U.S. patent application Ser. No. 09/651,934 assigned to the assignee of the present invention.

Each fuel cell 76 includes (FIGS. 5 and 6) an MEA 78, an upper gas distribution layer 80, a lower gas distribution layer 82, an upper gas separator plate 84, and a lower gas separator plate 86.

Each MEA 78 includes an ionomer membrane 88 in the form of a thin proton transmissive non-electrically conductive solid polymer electrolyte (SPE) membrane, an anode electrode catalyst layer 90 on the upper face of the membrane, and a cathode electrode catalyst layer 92 on the lower face of the membrane.

As is well understood, SPE membrane 88 provides for ion transport to facilitate reactions in the fuel cell stack 22. The electrodes of the fuel cell provide proton transfer by intimate contact between the electrodes and the ionomer membrane to provide essentially continuous polymeric contact for such proton transfer. This solid polymer electrolyte (SPE) membrane 88 is well known in the art as an ion conductive material. Typical SPE membranes are described in U.S. Pat. Nos. 4,272,353 and 3,134,697 and in Journal of Power Sources, Vol. 29 (1990), pages 367–387.

The SPE membranes or sheets are ion exchange resin membranes. The resins include ionic groups and their polymeric structure, one ionic component of which is fixed or retained by the polymeric matrix and at least one other ionic component being a mobile replaceable ion electrostatically associated with the fixed component. The ability of the mobile ion to be replaced under appropriate conditions with other ions imparts ion exchange characteristics to these materials.

Each of the electrodes 90, 92 is formed of a corresponding group of finely divided carbon particles and very finely divided catalytic particles and a proton conductive material intermingling with the particles. It should be noted that the carbon particles forming the anode electrode may differ from the carbon particles forming the cathode electrode. In addition, the catalyst loading at the anode electrode may differ from the catalyst loading at the cathode electrode. Although the characteristics of the carbon particles and the catalyst loading may differ from the anode electrode to the cathode electrode, the basic structure of the two electrodes is otherwise generally similar.

In order to provide a continuous path to conduct H+ions to the catalyst for reaction, the proton conductive material is dispersed throughout each of the electrodes, is intermingled with the carbon and catalytic particles, and is disposed in a plurality of the pores defined by the catalytic particles.

MEA 78 has a convoluted configuration and specifically, as seen in the preferred embodiment of FIG. 4, has an uneven or asymmetrical trapezoidal configuration comprising relatively narrow convolutions 78a alternating with relatively wide convolutions 78b.

Each gas distribution layer 80/82 is formed of a sheet of a conductive porous media and specifically of a conductive foam media. The preferred foam is open cell and may comprise either a conductive graphite foam media or a conductive metallic media. The conductive graphite foam media may comprise, for example, a graphitized pryrolytic material and the metal conductive foam media may comprise a high grade stainless steel or a metal alloy with a low contact resistance such as Inconel 601 or Stainless Steel 310.

Each gas distribution layer 80/82 has a trapezoidal configuration conforming to the trapezoidal configuration of MEA 78 so that layer 80, MEA 78, and layer 82 may fit together in a jigsaw puzzle fashion. Specifically, upper gas distribution layer 80 has a trapezoidal lower surface 80a corresponding to the trapezoidal configuration of MEA 78 and a generally planar upper surface 80b, and lower gas distribution layer 82 has a trapezoidal upper surface 82a corresponding to the trapezoidal configuration of MEA 78 and a generally planar lower surface 82b.

Each gas separator plate 84/86 has a planar configuration and is preferably formed of a conductive metallic material such as stainless steel or titanium.

Figure 5:
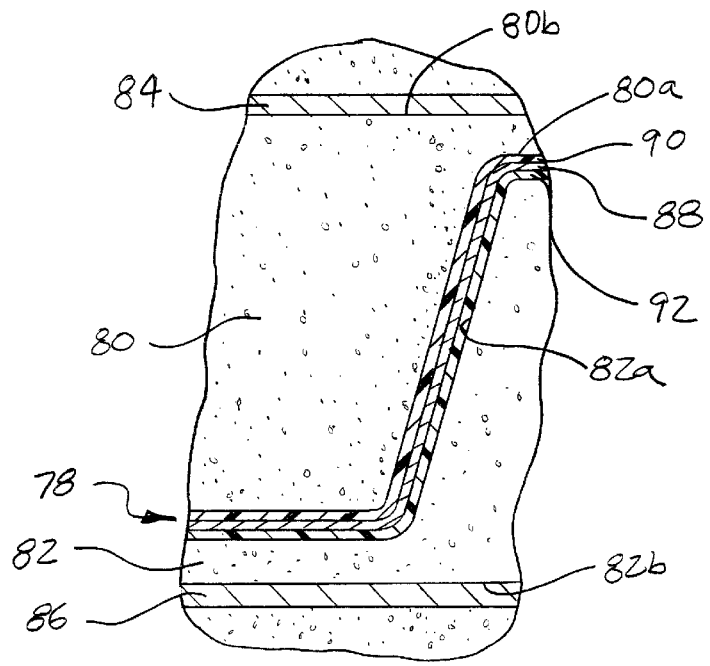
FIG. 5 is a detail view taken within the circle 5 of FIG. 4.
Figure 6:
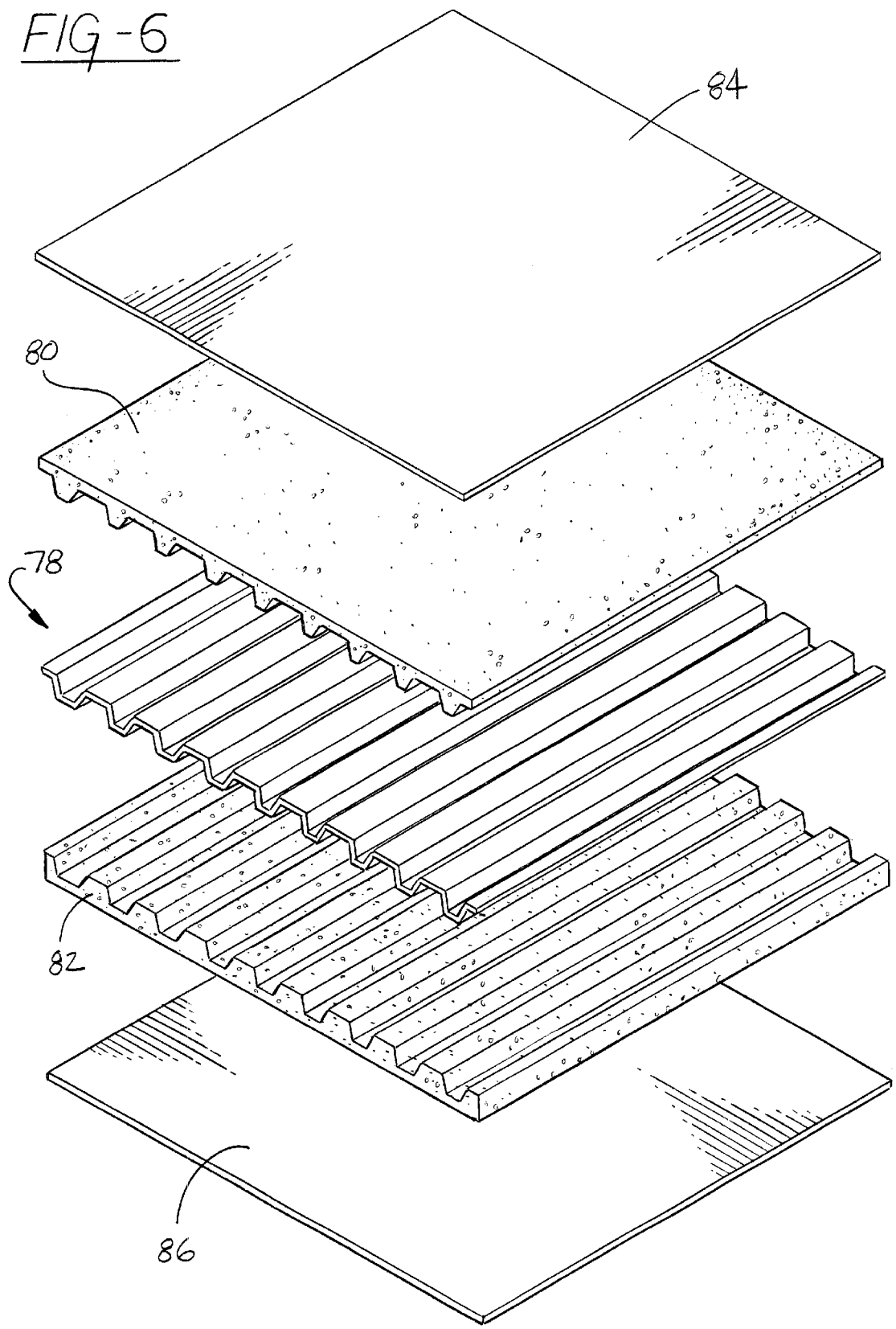
FIG. 6 is an exploded perspective view of a fuel cell according to the invention.

In the assembled relation of the fuel cell 22 seen in FIG. 5, the lower trapezoidal face 80a of upper gas distribution layer 80 is positioned against the upper trapezoidal face of MEA 78, the upper trapezoidal face 82a of lower gas distribution layer 82 is positioned against the lower trapezoidal face of MEA 78, the planar upper face 80b of upper gas distribution layer 80 is positioned against the planar under face of upper gas separator 84, and the planar lower face 82b of lower gas distribution layer 82 is positioned against the planar upper face of lower gas separator 86. Upper gas separator 84 is bonded to the upper face of layer 80 in a sintering, brazing, or conductive adhesive process and lower gas separator 86 is similarly bonded to the lower face of layer 82.

It will be seen (FIG. 4) that the peaks 78c of the MEA 78 are positioned proximate the upper gas separator plate 84 to define a series of spaced parallel channels 96 extending across the fuel cell stack from the inlet longitudinal side edge 22a of the stack to the outlet longitudinal side edge 22b of the stack and the valleys 78d of the MEA are positioned proximate the lower gas separator 86 to define a series of parallel spaced channels 98 extending across the fuel cell stack from inlet side edge 22a to outlet side edge 22b. By virtue of the uneven or asymmetrical nature of the trapezoidal configuration of the MEA, the parallel spaced channels 98 are wider than the parallel spaced channels 96 whereby to provide a greater gas flow capacity. The asymmetrical configuration of the MEA allows greater quantities of air to be delivered to the cathode of the MEA than the quantities of $H_2$ or reformate delivered to the anode of the MEA, in compensation for the fact that the air is only 21% $O_2$.

The fuel cell structure seen in FIG. 4 will be seen to comprise two stacked fuel cells 76 separated by a cooling layer 104 positioned between the upper gas separator plate 84 of the lower fuel cell and the lower gas separation plate 86 of the upper fuel cell. Cooling layer 104 may comprise an open cell foam structure similar to the type employed for gas distribution layers 80 and 82 and may be divided into parallel segments extending across the fuel cell from inlet side edge to outlet side edge of the fuel cell by relatively dense foam members 106 positioned at spaced points along the cooling layer.

In use, hydrogen-rich reformate 20 is routed by suitable manifolding through the small channels 96 for reaction with the anode electrode 90 of the MEA while air is simultaneously passed via suitable manifolding through the relatively large channels 98 for reaction with the cathode electrode 92 of the MEA. As the hydrogen-rich reformate moves through channels 96, it is confined by the convoluted configuration of the MEA essentially to the respective channels 96 so that little or no cross migration occurs between the parallel channels whereby to ensure an essentially uniform distribution of hydrogen across the surface of the anode electrode irrespective of unavoidable and significant variations in the porosity of the foam material of the foam media, whereby to maximize the generation of electrical energy occurring by virtue of the interaction between the hydrogen and the anode electrode. The gas flow distribution over the anode electrode is essentially uniform since the resistance to flow is the total restriction along each channel and thus variations in porosity are averaged over the length of a channel rather than allowing a local perturbation to affect the entire flow field.

Similarly, the air moving through the wide channels 98 is confined by the convoluted configuration of the MEA to the respective channels so that little or no cross migration occurs between the parallel channels whereby to ensure an essentially uniform distribution of oxygen across the surface of the cathode electrode irrespective of unavoidable and significant variations in the porosity of the foam material of the foam media, whereby to maximize the generation of electrical energy occurring by virtue of the interaction between the oxygen and the cathode electrode.

Further, and according to an important aspect of the invention, the convoluted configuration of the MEA maximizes the ratio of membrane area to effective planar area of the fuel cell to increase the electrical output of the fuel cell for a given effective planar fuel cell area.

The coolant such as water moving through the cooling layer 104 from inlet side edge to outlet side edge of the fuel cell stack is restricted to the respective parallel segments of the cooling layer by the dense foam strips 106 whereby to ensure an essentially uniform distribution of coolant across the surfaces of the fuel cell irrespective of the unavoidable and significant variations in the porosity of the foam material of the cooling layer.

The alternative fuel cell construction seen in FIG. 7 corresponds generally to the construction seen in FIG. 4 with the exception that the MEA 178 has an even or uniform trapezoidal configuration so that the channels 196 and 198 defined by the MEA are essentially equal in volume so that essentially uniform volumes of reformate and air are delivered to the anode and cathode electrodes respectively.

The fuel cell construction seen in FIG. 8 is generally similar to the construction of FIG. 4 with the exception that the MEA 278 has a uniform sinusoidal configuration which again produces similar size channels for the transport of the air and the reformate across the fuel cell.

The fuel cell construction seen in FIG. 9 is generally similar to the construction of FIG. 4 with the exception that the MEA 378 has a uniform triangular configuration so as to again provide passages for the flow of the reformate and the air across the fuel cell of essentially equal size.

The fuel cell construction seen in FIG. 10 is generally similar to the construction seen in FIG. 8 with the exception that the foam gas distribution layers 480 and 482 are formed in a compressing or crushing process from foam blocks of uniform thickness so that the density of the gas distribution layer 482 varies from a minimum density proximate the peaks 478*a* of the MEA 478 to a maximum density proximate the valleys 478*b* of the MEA 478 and the density of the gas distribution layer 480 varies from a minimum density proximate the valleys 478*b* to a maximum density proximate the peaks 478*a*. As a result, maximum density gas distribution layer areas are located proximate the peaks and valleys of the MEA whereby to further accentuate the separation between the successive parallel hydrogen reformate channels 496 and between the successive parallel oxygen channels 498 whereby to further minimize cross migration between the parallel channels and ensure essentially uniform distribution of reformate and oxygen across the surfaces of the respective electrodes.

In the fuel cell construction seen in FIG. 11, the MEA 578 has a uniform sinusoidal configuration and the gas distribution layers are constituted by thin layers 100 of conductive open cell foam material (graphite or metallic) having an overall convoluted configuration corresponding to the convoluted configuration of the MEA. A layer 100 is positioned against each face of the MEA so as to form a sinusoidal sandwich construction with the MEA positioned in the space between the gas separation plates 84 and 86. The peaks 100*a* of the upper layer 100 are bonded to the under face of the upper separation plate 84 and the valleys 100*b* of the lower layer 100 are bonded to the upper face of the lower separation plate 86 in a manner to achieve an electrically conductive connection between the layers 100 and the plates 84/86. If a metal foam material is utilized for the layers 100, the bonding at the points 100*a* and 100*b* may be by sintering, brazing, or by the use of diffusion bonding. If graphite foam is utilized as the material of the layers 100, the bonding is achieved utilizing conductive epoxies. The layers 100 have sufficient rigidity to provide support for the membrane 578 sandwiched therebetween and the contact points between the layers 100 and the upper and lower plates 84 and 86 serve to precisely and positively separate the parallel reformate channels 596 and the parallel oxygen channels 598 whereby to minimize cross migration between the parallel channels and ensure essentially uniform distribution of hydrogen and oxygen across the surfaces of the respective electrodes. The arrangement of FIG. 11 has the further advantage that the channels 596 and 598 are totally unobstructed so that, for given a requirement of gas flow volume through the channels, the channel size can be minimized with a consequent reduction in the overall size of the fuel cell.

Figure 12:
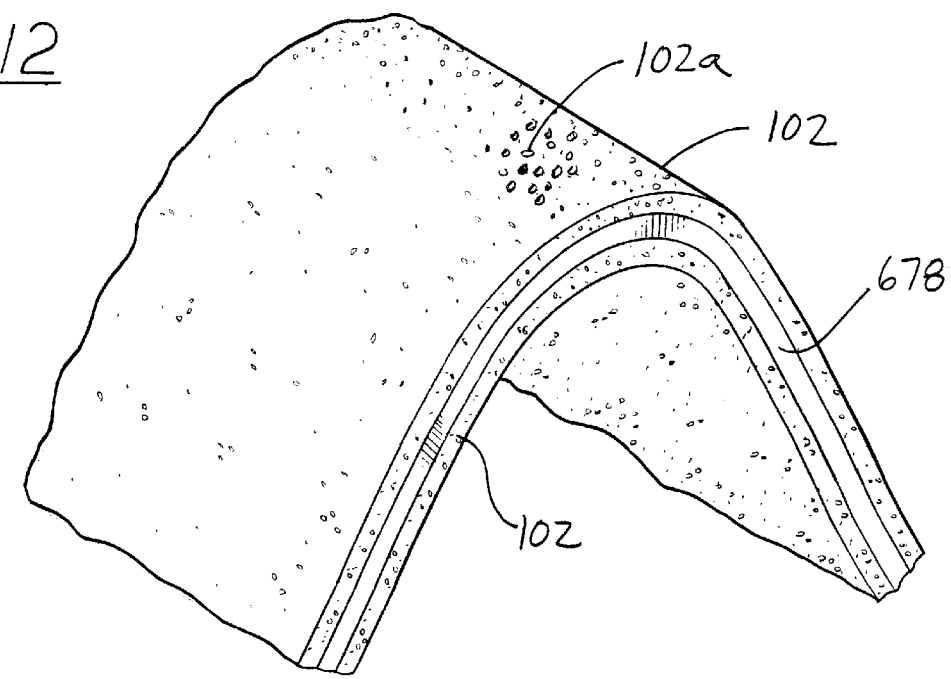
FIGS. 12 and 13 illustrate modifications to the fuel cell form seen in FIG. 11.

As an alternative to the construction of FIG. 11, and as seen in FIG. 12, the foam layers 100 may be replaced with a thin metal foil layer 102 on opposite sides of the MEA 678. The foil layers 102 are provided with perforations or holes 102*a* to allow access of the respective gases flowing through the respective channels to the respective MEA electrode.

Figure 13:
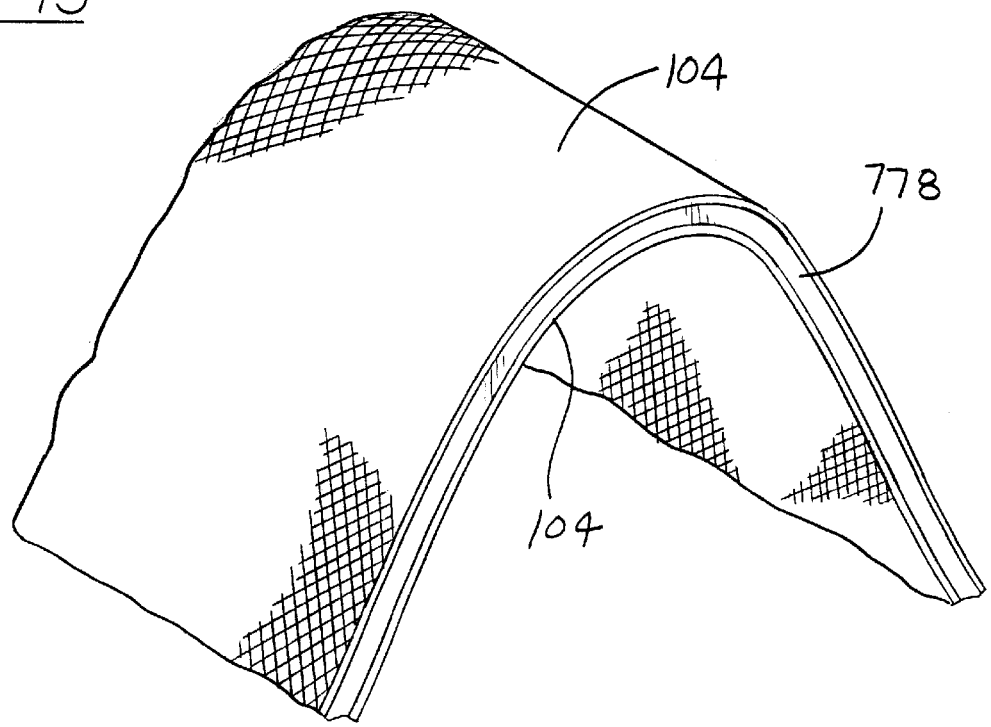

As a further alternative, and as seen in FIG. 13, the foam layers 100 may be replaced with a metallic wire screen 104 positioned on opposite sides of the MEA 778.

It will be understood that, in both the foil configuration of FIG. 12 and the wire screen configuration of FIG. 13, the layer 102/104 would be bonded to the separator plates 84 and 86 utilizing sintering, brazing, diffusion bonding, or adhesive epoxy bonding.

The invention will be seen to provide an improved fuel cell wherein the convoluted configuration of the MEA increases the ratio of membrane area to planar fuel cell area whereby to increase the electrical output of the fuel cell for a given planar area size fuel cell. The convoluted MEA configuration also facilitates the division of the gas distribution layers into separate parallel channels or segments, thereby allowing the use of an inexpensive foam material for the gas distribution layers irrespective of the inherent variations in porosity of foam materials.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A proton exchange membrane fuel cell including a membrane electrode assembly comprising a proton transmissive membrane, a catalytic anode layer on one face of the membrane, and a catalytic cathode layer on the other face of the membrane;
    electrically conductive fluid distribution media on each of the cathode and anode layers defining a gas flow field extending over each of the catalytic layers;
    the membrane electrode assembly having a convoluted configuration;
    the gas distribution media defining a convoluted surface juxtaposed to the respective catalytic layer;
    a separator element juxtaposed to the respective distribution media and having a non-convoluted surface facing the distribution media; and
    the surface of the gas distribution media facing the separator element having a shape which is non-convoluted and which corresponds to the shape of the facing separator element.

2. A fuel cell according to claim 1 wherein the gas distribution media is formed of a conductive porous media.

3. A proton exchange membrane fuel cell including a membrane electrode assembly (MEA) comprising a proton transmissive membrane, a catalytic anode layer on one face of the membrane, and a catalytic cathode layer on the other face of the membrane;
    an electrically conductive distribution layer on each of the cathode and anode layers defining a gas flow field extending over each of the catalytic layers;
    the membrane electrode assembly having a convoluted configuration defining alternating peaks and valleys;
    the membrane electrode assembly and the gas distribution layers form a sandwich construction having first and second opposite edges;
    each gas distribution layer is formed of conductive foam media and is divided by the convolutions of the MEA into a plurality of generally parallel segments each extending from the first edge to the second edge of the sandwich construction whereby to define a plurality of generally parallel separate porous reactant paths extending across each catalytic layer;
    first and second gas separators outboard of the respective distribution layers;
    the foam media fills the space defined by the MEA and respectively the first and second separators; and
    the peaks of the MEA being positioned proximate the first gas separator and the valleys of the MEA being positioned proximate the second gas separator whereby to accentuate the separation of the porous reactant paths extending across each catalytic layer.

4. A fuel cell according to claim 3 wherein the separation between the paths is further accentuated by decreasing the porosity of each gas distribution layer proximate the peaks and valleys of the MEA.

5. A fuel cell according to claim 3 wherein the foam media comprises a conductive graphite foam media.

6. A fuel cell according to claim 3 wherein the foam media comprises a conductive metallic foam media.

7. A proton exchange membrane fuel cell including a membrane electrode assembly (MEA) comprising a proton transmissive membrane, a catalytic anode layer on one face of the membrane, and a catalytic cathode layer on the other face of the membrane; and
    an electrically conductive distribution layer on each of the cathode and anode layers defining a gas flow field extending over each of the catalytic layers;
    the membrane electrode assembly having a convoluted configuration;
    each gas distribution layer is formed of conductive foam media and has an overall convoluted configuration corresponding to the convoluted configuration of the membrane electrode assembly and is positioned in meshing fashion against a respective catalytic layer;
    a conductive first gas separator and a conductive second gas separator positioned above the first gas separator; and wherein
    the foam media fills the space defined by the MEA and respectively the first and second separators; and wherein
    the membrane electrode assembly is positioned with successive peaks of one of the gas distribution layers in electrical contact with successive points on the first gas separator and successive valleys of the other gas distribution layer in electrical contact with successive points on the second gas separator.

8. A proton exchange membrane fuel cell stack including a plurality of stacked fuel cells, each fuel cell comprising:
    a membrane electrode assembly comprising a proton transmissive membrane having a convoluted configuration;
    a catalytic anode layer on one face of the membrane, and a catalytic cathode layer on the other face of the membrane; and
    a sheet of electrically conductive porous foam material positioned proximate each catalytic layer, each sheet having a convoluted surface corresponding to the convoluted configuration of the membrane and the convoluted surface of each sheet being juxtaposed to a respective catalytic layer, each sheet having inlet and outlet opposite longitudinal edges, and the convolutions of the MEA serving to divide each sheet into a plurality of generally parallel segments extending from the inlet edge to the outlet edge of the sheet, whereby to define a plurality of separate generally parallel porous reactant paths filled with said foam material and extending across each catalytic layer.

9. A fuel cell stack according to claim 8 wherein:
    each fuel cell further includes upper and lower generally planar gas separators defining a space therebetween; and
    the MEA and porous material sheets are positioned in the space with peaks of the MEA positioned proximate the upper gas separator and valleys of the MEA positioned proximate the lower gas separator, whereby to accentuate the separation of the porous reactant paths extending across each catalytic layer.

10. A fuel cell stack according to claim 9 wherein the separation between the reactant paths is further accentuated by decreasing the porosity of each sheet proximate the peaks and valleys of the MEA.

11. A fuel cell stack according to claim 8 wherein the foam material comprises a conductive graphite foam material.

12. A fuel cell stack according to claim 8 wherein the foam material comprises a conductive metallic foam material.

13. A proton exchange membrane fuel cell comprising:

a conductive lower generally planar gas separator;

a conductive upper generally planar gas separator positioned above the lower gas separator and defining a space therebetween;

a membrane electrode assembly comprising a proton transmissive membrane, a catalytic anode layer on one face of the membrane, and a catalytic cathode layer on the other face of the membrane, the membrane electrode assembly having a convoluted configuration, being positioned in the space, and including successive peaks positioned spaced from successive points on the upper gas separator and successive valleys positioned spaced from successive points on the lower gas separator, whereby to define a series of generally parallel upper channels between the membrane electrode assembly and the upper gas separator for delivery of a first gas to one of the catalytic layers and a series of generally parallel lower channels between the membrane electrode assembly and the lower gas separator for delivery of a second gas to the other catalytic layer; and the upper and lower channels are filled with an electrically conductive porous media whereby to define upper and lower gas distribution layers.

14. A proton exchange membrane fuel cell according to claim 13 wherein the porous media comprises a conductive foam media.

15. A proton exchange membrane fuel cell according to claim 14 wherein the foam media comprises a conductive metallic foam media.

16. A proton exchange membrane fuel cell according to claim 14 wherein the foam media comprises a conductive graphite foam media.

17. A proton exchange membrane fuel cell according to claim 13 wherein the convolutions of the membrane electrode assembly are uneven such that one of the upper and lower channels are larger than the other of the upper and lower channels, whereby to facilitate the delivery of disparate quantities of the first and second gases to the respective catalytic layers.

18. A proton exchange membrane fuel cell according to claim 17 wherein alternate convolutions define the larger channels, and the remaining convolutions are relatively narrow as compared to said alternate convolutions, whereby to define the smaller channels.

19. A proton exchange membrane fuel cell according to claim 13 wherein an upper conductive convoluted gas distribution layer is positioned between the membrane electrode assembly and the upper gas separator against one of the catalytic layers of the membrane electrode assembly and a lower conductive convoluted gas distribution layer is positioned between the membrane electrode assembly and the lower gas separator against the other catalytic layer of the membrane electrode assembly, the gas distribution layers having sufficient rigidity to provide support for the membrane electrode assembly sandwiched therebetween, successive peaks of the upper gas distribution layer being in electrical contact with successive points on the upper gas separator and successive valleys of the lower gas distribution layer being in electrical contact with successive points on the lower gas separator, the upper channels being defined between the upper gas distribution layer and the upper gas separator and the lower channels being defined between the lower gas distribution layer and the lower gas separator.

20. A proton exchange membrane fuel cell comprising a membrane electrode assembly (MEA) having a convoluted configuration, the MEA comprising a proton transmissive membrane, a catalytic layer on one face of the membrane, and a catalytic layer on the other face of the membrane;

an electrically conductive separator element having a surface which is not convoluted and which faces the MEA;

a gas flow field extending over at least one of the catalytic layers, the gas flow field comprising an electrically conductive fluid distribution media between the MEA and the separator element;

a first surface of the media being in contact with the MEA, and having a convoluted shape conforming to the convoluted shape of the MEA; and a second surface of the media being in contact with the separator element, the second surface having a shape corresponding to the shape of the facing surface of the separator element.

* * * * *